(12) United States Patent
Dahl et al.

(10) Patent No.: US 7,925,955 B2
(45) Date of Patent: *Apr. 12, 2011

(54) TRANSMIT DRIVER IN COMMUNICATION SYSTEM

(75) Inventors: Sten Jorgen Dahl, San Diego, CA (US); Kenton A. Younkin, San Diego, CA (US); Devarshi Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 607 days.

This patent is subject to a terminal disclaimer.

(21) Appl. No.: 11/373,606

(22) Filed: Mar. 9, 2006

(65) Prior Publication Data

US 2006/0218472 A1    Sep. 28, 2006

Related U.S. Application Data (60) Provisional application No. 60/660,906, filed on Mar. 10, 2005.

(51) Int. Cl.
*H03M 13/00* (2006.01)
(52) U.S. Cl. ........................ 714/755; 714/786
(58) Field of Classification Search .............. 714/755, 714/785–786, 781, 758
See application file for complete search history.

(56) References Cited

U.S. PATENT DOCUMENTS

| | | | |
|---|---|---|---|
| 5,241,546 A | 8/1993 | Peterson | |
| RE34,810 E | 12/1994 | Lemaine | |
| 5,504,732 A | 4/1996 | Gregg | |
| 5,633,870 A | 5/1997 | Gaytan | |
| 5,878,217 A | 3/1999 | Cherukuri | |
| 6,335,985 B1 | 1/2002 | Sambonsugi | |
| 6,490,705 B1 | 12/2002 | Boyce | |
| 6,516,441 B1 | 2/2003 | Kim | |
| 6,530,055 B1 | 3/2003 | Fukunaga | |
| 6,553,540 B1 | 4/2003 | Schramm | |
| 6,804,494 B2 | 10/2004 | Fernandez-Corbaton | |
| 7,180,643 B2 | 2/2007 | Furuta et al. | |
| 7,197,692 B2 | 3/2007 | Sutivong | |
| 7,450,610 B2 | 11/2008 | An | |
| 2002/0063807 A1 | 5/2002 | Margulis | |
| 2003/0215014 A1 | 11/2003 | Koto et al. | |
| 2003/0227851 A1 | 12/2003 | Furuta | |
| 2004/0071354 A1 | 4/2004 | Adachi | |

(Continued)

FOREIGN PATENT DOCUMENTS

CL    00857-1995    6/1995

(Continued)

OTHER PUBLICATIONS

International Search Report—PCT/US06/008978, International Search Authority—European Patent Office—Jul. 3, 2006.

(Continued)

*Primary Examiner* — Guy J Lamarre
(74) *Attorney, Agent, or Firm* — Gerald P. Joyce, III (57) ABSTRACT

Embodiments describe a transmit driver that processes data communication between a scheduler and a turbo encoder. Transmit driver receives a request for a super frame and ascertains whether it has enough information to start the super frame. If there is enough data, the super frame is written to an appropriate hardware register. Both Direct Memory Access (DMA) and non-DMA hardware can be supported with the one or more embodiments.

20 Claims, 10 Drawing Sheets

U.S. PATENT DOCUMENTS

| | | |
|---|---|---|
| 2005/0030207 A1 | 2/2005 | Craven |
| 2005/0129128 A1 | 6/2005 | Chou |
| 2005/0135308 A1 | 6/2005 | Vijayan et al. |
| 2005/0141475 A1 | 6/2005 | Vijayan et al. |
| 2005/0163211 A1 | 7/2005 | Shanableh |
| 2005/0275573 A1 | 12/2005 | Raveendran |
| 2006/0013320 A1 | 1/2006 | Oguz |
| 2006/0093031 A1 | 5/2006 | Van Der Schaar |
| 2006/0146934 A1 | 7/2006 | Caglar |
| 2006/0215539 A1 | 9/2006 | Vrcelj |
| 2006/0215761 A1 | 9/2006 | Shi |
| 2006/0222078 A1 | 10/2006 | Raveendran |
| 2006/0230162 A1 | 10/2006 | Chen |
| 2006/0233239 A1 | 10/2006 | Sethi |
| 2006/0282737 A1 | 12/2006 | Shi |
| 2007/0089021 A1* | 4/2007 | Younkin et al. ............... 714/752 |

FOREIGN PATENT DOCUMENTS

| | | |
|---|---|---|
| CL | 00114-1996 | 1/1996 |
| CL | 01936-2000 | 7/2000 |
| EP | 0 752 801 A2 | 1/1997 |
| EP | 1301044 A1 | 4/2003 |
| EP | 1 484 867 A2 | 12/2004 |
| JP | 62002747 | 1/1987 |
| JP | 06046020 | 2/1994 |
| JP | 9128315 | 5/1997 |
| JP | 9247681 | 9/1997 |
| JP | 2001510007 T | 7/2001 |
| JP | 2004364257 | 12/2004 |
| JP | 2005518142 | 6/2005 |
| KR | 20030058472 A | 7/2003 |
| KR | 20040076428 A | 9/2004 |
| RU | 2219671 | 12/2003 |
| WO | WO99/50963 | 10/1999 |
| WO | WO03069834 A1 | 8/2003 |
| WO | WO2004062133 | 7/2004 |
| WO | WO 2005/022811 A2 | 3/2005 |
| WO | WO2005/107421 | 11/2005 |

OTHER PUBLICATIONS

International Search Report—PCT/US2006/008978, International Search Authority—European Patent Office—Jul. 3, 2006.

Written Opinion—PCT/US2006/008978, International Search Authority—European Patent Office—Jul. 3, 2006.

Aign s et al; "Temporal and Spatial Error Concealment Techniques for Hierarchical MPEG-2 Video Codec", IEEE, US, vol. 3, Jun. 18, 1995, pp. 1778-1783.

Al-Mualla, "Multiple-Reference Temporal Error Concealment," May 2001, IEEE, vol. 1, May 2001, pp. 149-152.

Bansal et al.; "Improved Error Detection and Localization Techniques for MPEG-4" Sep. 22-25, 2002, pp. 693-696.

Belfiore et al; "Spatiometeral Error Concealement With Optimized Mode Selection and Application to H.264", vol. 18, No. 10, Nov. 2003, pp. 907-923.

European Search Report—EP2019554, Search Authority - Munich Patent Office - Jan. 29, 2009 (050304).

International Preliminary Report of Patentability- PCT/US2006/008763, International Search Authority - The International Bureau of WIPO, Geneva, Switzerland - Sep. 12, 2007.

International Search Report - PCT/US07/072031, International Search Authority - European Patent Office - Jan. 21, 2008.

International Search Report - PCT/US2006/008489, International Search Authority - European Patent Office - Sep. 12, 2007.

International Search Report - PCT/US2006/008763 - International Search Authority, European Patent Office-Mar. 13, 2007.

Suh et al., "Recovery of Motion Vectors for Error Concealment,", Sep. 1999, IEEE vol. 1, pp. 750-753.

Sun, H, et al., "Error Concealment Algorithms for Robust Decoding MPEG Compressed Video" vol. 10, No. 4, Sep. 1997, pp. 249-268.

Written Opinion - PCT/US2006/008489, International Search Authority - European Patent Office - Sep. 12, 2007.

Written Opinion-PCT/US2006/008763, International Search Authority-European Patent Office- Mar. 13, 2007.

Yasuichi, "Chapter 3. OSI Reference Model, 4. Session Layer, Presentation Layer and Application Layer," Network Technology Seminar, Detailed Explanation of TCP/IP Protocol, Itmedia Inc., Jul. 19, 2000, URL:http://www.atmarkit.co.jp/fwin2k/network/tcpip003/tcpip05.html.

* cited by examiner

TRANSMIT DRIVER IN COMMUNICATION SYSTEM

CROSS-REFERENCE TO RELATED APPLICATIONS

This application claims the benefit of U.S. Provisional Application Ser. No. 60/660,906, filed Mar. 10, 2005, entitled "A TRANSMIT DRIVER IN COMMUNICATION SYSTEM," the entirety of which is incorporated herein by reference.

BACKGROUND

I. Field

The following description relates generally to communication systems and, amongst other things, to data transmission in a communication system.

II. Background

A technique for broadcasting (by mobility standards) high rate data signals (e.g., high frame rate video) is Orthogonal Frequency Division Multiplexing (OFDM). OFDM is a parallel transmission communication scheme where a high-rate data stream is split over a large number of lower-rate streams and transmitted simultaneously over multiple sub-carriers spaced apart at particular frequencies or tones. The precise spacing of frequencies provides orthogonality between tones. Orthogonal frequencies minimize or eliminate crosstalk or interference amongst communication signals. In addition to high transmission rates, and resistance to interference, high spectral efficiency can be obtained as frequencies can overlap without mutual interference.

Multicasting technology for transmission of multimedia has been developed by an industry group of wireless communication service providers to utilize the latest advances in system design to achieve the highest-quality performance. Industry-accepted technologies, such as Forward Link Only (FLO) and Digital Video Broadcast (DVB) are intended for a mobile multimedia environment and is suited for use with mobile user devices. In particular, FLO technology can provide robust mobile performance and high capacity without compromising power consumption. In addition, the technology reduces the network cost of delivering multimedia content by decreasing the number of base station transmitters that are needed to be deployed. Furthermore, FLO technology based multimedia multicasting is complimentary to the wireless operators' cellular network data and voice services, delivering content to the same mobile devices.

Multicast systems support different types of services, such as real-time services, non-real-time services, IP datacast services, and common overhead service. Real-time services involve streaming of media content (e.g., audio, audio and video, and the like). Non-real-time services involve the delivery of media files (clips), which can be stored on a device and accessed by a user during a planned availability period. Non-real-time services can be referred to as clipcast services. IP datacast services are wireless IP multicast services for a wide range of applications. Common overhead services carry system overhead data.

Different types of services call for different Quality of Services (QoS). For example, real-time services have strict latency needs but can tolerate some packet errors. Non-real-time services are intended to be delivered at the devices before the advertised availability period and, therefore, have an associated deadline. Non-real-time services are delivered as files (e.g., clips), and thus, should conform to strict packet error mitigation. QoS necessary for an IP datacast service depends on the application intended on that service. Common overhead service carries important system overhead information that should be received at the device with low acquisition delays. Therefore, common overhead service should have low latency and low packet error rates. In multicast systems, there are various functions that collaborate to achieve the necessary QoS for different services. These functions are collectively termed as resource management functions.

Efficient data communication reduces system latency and error rates. Therefore, what is needed is a technique for providing efficient data communication in a wireless network.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with data transmission. According to an embodiment is a method for data transmission. The method includes maintaining a sorted list of turbo groups. Logical channel (LC) can comprise about four or more turbo groups. A turbo group can comprise about four turbo packets. The method further includes receiving a request from an encoder for a super frame and ascertaining if enough data is available to process the super frame by analyzing the maintained list of turbo groups. If there is enough data available, the super frame is sent to one or more registers associated with a direct memory access hardware component or a non-direct memory access hardware component.

According to another aspect is an apparatus for data transmission. The apparatus includes a receiver, a storage medium, an analyzer, and a writer. The receiver can receive a request for a super frame and the storage medium can maintain a list of turbo groups. Upon receipt of the request by receiver, the analyzer can analyze the maintained list of turbo groups and determine if there is data available to begin a super frame based on the received request. If there is data available, the writer writes the super frame to a hardware register.

In another aspect, a computer readable medium having a computer program for data transmission maintains a list of turbo groups. The computer program further receives a request for a super frame and analyzes the maintained list of turbo groups to determine if data is available to begin a super frame based on the received request. If the data is available, the super frame is written to a hardware register.

In yet another aspect, an apparatus for communicating data includes a means for maintaining a list of turbo groups, a means for receiving a super frame request, and a means for reviewing the maintained list to determine if data is available to complete the request. If the data is available to complete the request, a means for transmitting the super frame to a register outputs the requested data.

According to another aspect is a processor that executes instructions for data communication. The instructions include sorting a listing of turbo groups; wherein a turbo group includes at least four turbo packets and a logical channel (LC) includes at least four groups of four turbo packets, the sorted list of turbo groups are stored. The instructions further include receiving a request for a super frame and determining if enough data is available to process the super frame by analyzing the stored list of turbo groups. If there is enough data available, the super frame is output to a hardware component.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, handset, host, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device(s) connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . )

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used.

Figure 1:
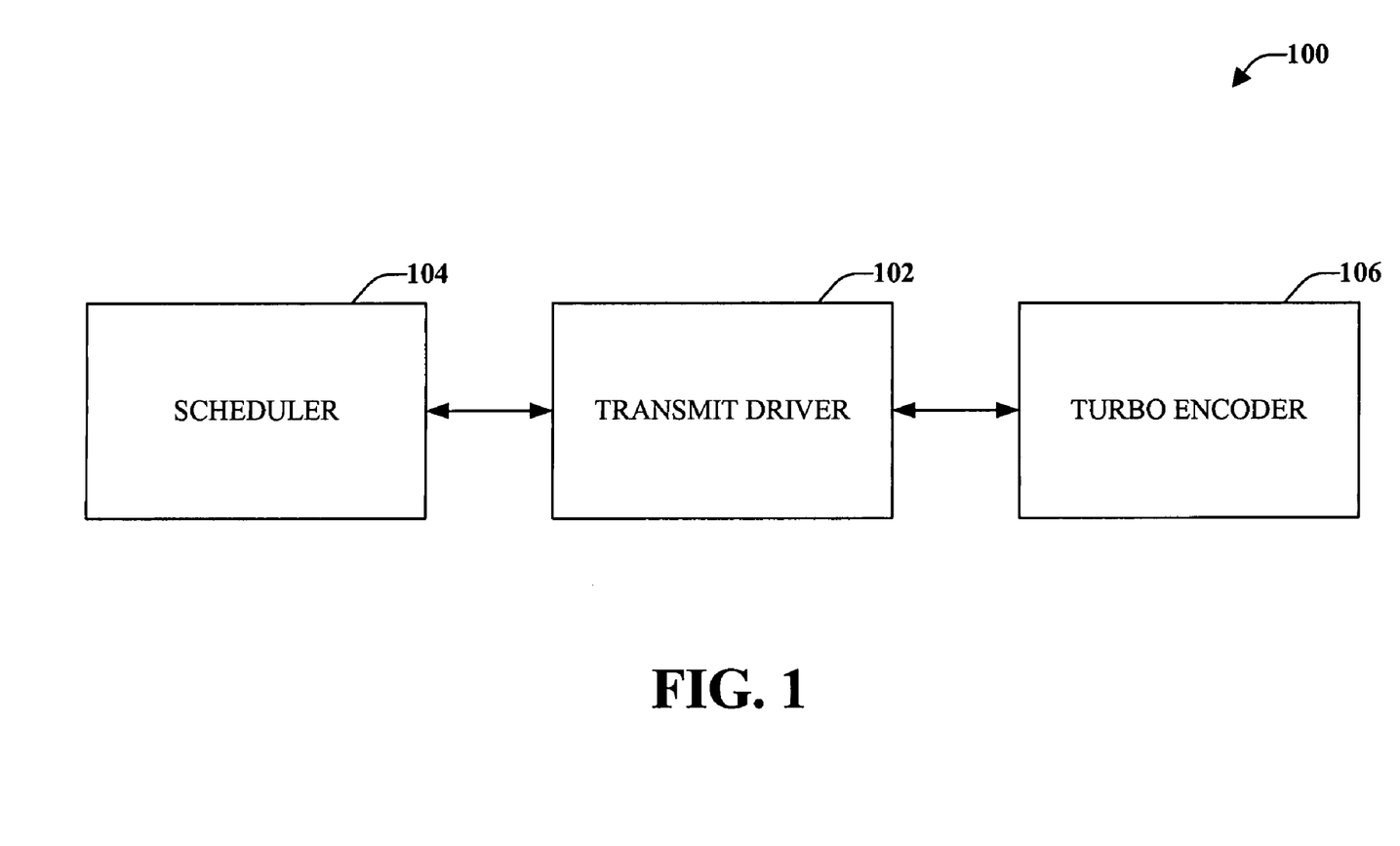
FIG. 1 is a block diagram of a data transmission system.

With reference now to the drawings, FIG. 1 illustrates a system 100 for data transmission. System 100 can be configured to supply data to hardware for over the air transmission in a time prioritized manner, wherein the data can be prioritized according to a starting symbol. To fully appreciate the one or more embodiments disclosed herein, a brief overview of communication concepts will now be discussed. An OFDM symbol is the smallest transmission unit and can have a duration of about 833.33 microseconds. A frame is a packet of data and its data channel is composed of 297 OFDM symbols and seven slots. The intersection between a symbol and a slot is referred to as a "data slot" and there are 2079 data slots per frame. A Turbo Packet comprises 125 bytes of data and a Reed-Solomon (RS) Code block comprises 16 turbo packets. A Logical Channel (LC) can include one or more RS Code blocks.

A super frame includes local overhead information symbols (LOI), wide overhead information symbols (WOI), and around four frames of LC data. Media streams may be transmitted as a group of LCs distributed over multiple super frames. For transmission, each RS code block of an LC is divided into about four groups of four turbo packets. There is one turbo packet group of a given RS code block transmitted per frame.

For Direct Memory Access (DMA) hardware, coding differences allow a minimum of three slots (16-QAM 2/3) per turbo group (4 turbo packets) to a maximum of twelve slots (QPSK 1/3) per turbo group. Based on 16-QAM 2/3 coding, the maximum number of turbo groups per frame is 693. If a limit of 256 turbo groups per frame is maintained, it yields a maximum data rate of approximately 3.8 megabits per second. For non-Direct Memory Access (non-DMA) hardware, turbo group patterns should be scheduled to span at least two symbols, instead of a single symbol and multiple slots, to allow a central processing unit (CPU) enough time to supply data to various hardware components.

With reference again to FIG. 1, system 100 can buffer at least two super frames worth of data at substantially the same time. For example, system 100 can transmit one super frame of data while building the next super frame. For non-Direct Memory Access (non-DMA) hardware, LCs should be scheduled to span at least two symbols. System 100 can be configured to support about 256 LCs per super frame and approximately 256 turbo groups per LC. One local overhead information data group comprised of about seven turbo packets, and one wide overhead information data group comprised of about seven turbo packet should be supported per super frame where the overhead information symbol (OIS) may contain information for up to 256 LCs.

System 100 includes a transmit driver 102 that can operate on a computer, such as a personal computer. Transmit driver 102 can be configured to operate as an interface between a scheduler 104 and a turbo encoder 106. Turbo encoder 106 and scheduler 104 can be applications residing in a computer and can be accessed through a peripheral control interconnect (PCI) interface bus, for example. However, it should be understood and appreciated that other techniques for accessing these components can be utilized. Scheduler 104 can provide LC data streams to transmit driver 102, which can communicate the LC data streams to turbo encoder 106 through one or more function calls, for example. Turbo encoder 106 can accept the LC data streams and encode them for over the air (e.g., wireless) transmission.

Scheduler 104 (also referred to as Transmit (Tx) driver client) can interact with transmit driver 102 through various function calls including: a TxOpen function call, a TxClose function call, a TxSuperFrameSend function call, and/or a TxDiagnostic function call. Scheduler 104 can allocate or designate transmit driver 102 by invoking the TxOpen function. Along with (either embedded or separate) the function call, a callback function pointer can be supplied. The callback function can be utilized to notify the client or scheduler 104 when a super frame has completed, and of error conditions (e.g., transmit driver requests a super frame but does not receive it before expiration of a time out, etc.). Turbo encoder 106 can notify scheduler 104 through transmit driver 102 that an error has occurred (e.g., data transmit error, etc.) To deallocate transmit driver 102, scheduler 104 can invoke the TxClose function call.

Tx driver client or scheduler 104 can provide media to transmit driver 102 one super frame at a time by invoking the TxSuperFrameSend function call. Scheduler 104 can provide the LOI data, WOI data and a list of LCs that might be transmitted during that super frame. Transmit driver 102 can double buffer the super frames and notify scheduler 104 when a super frame buffer is available. Diagnostic functions can be performed when scheduler 104 invokes the TxDiagnostic function and supplies appropriate diagnostic data to carry out such diagnosis function.

Turbo encoder 106 can interact with system 100 and can transmit about seven data slots simultaneously, one per slot for any given symbol. Turbo encoder 106 can be configured as a ping pong buffer for seven LCs capable of storing two turbo groups each. Control registers for each buffer that specify the starting symbol, slot, number of slots (height) and encoding mode can also be provided by turbo encoder 106. Turbo encoder 106 can further be configured as a status register for each buffer indicating whether the buffer is idle or in use and can generate interrupts to signal idle buffers.

Transmit driver 102 may be operating on a computer that may also be performing scheduling, Reed Solomon encoding, and/or other logistical activities. Thus, the processing should be as efficient as possible in terms of CPU time. In the computer environment, memory can be added at minimal cost, and therefore, memory can be utilized when such usage results in reduced CPU usage. Copying of data can be minimized by passing a pointer to a single instance of data, which can result in more memory usage since at least two super frames of data may need to be buffered by the client.

For non-DMA hardware, turbo encoder 106 can use small buffers and have continuous interaction with transmit driver 102 to supply the data stream. This can be achieved with low latency, high priority interrupt processing. A thread safe design can be employed that does not use semaphore access guards. In accordance with some embodiments, the client can provide the majority of data buffering and, therefore, less than around one kilo-byte of statically allocated RAM might be used.

Figure 2:
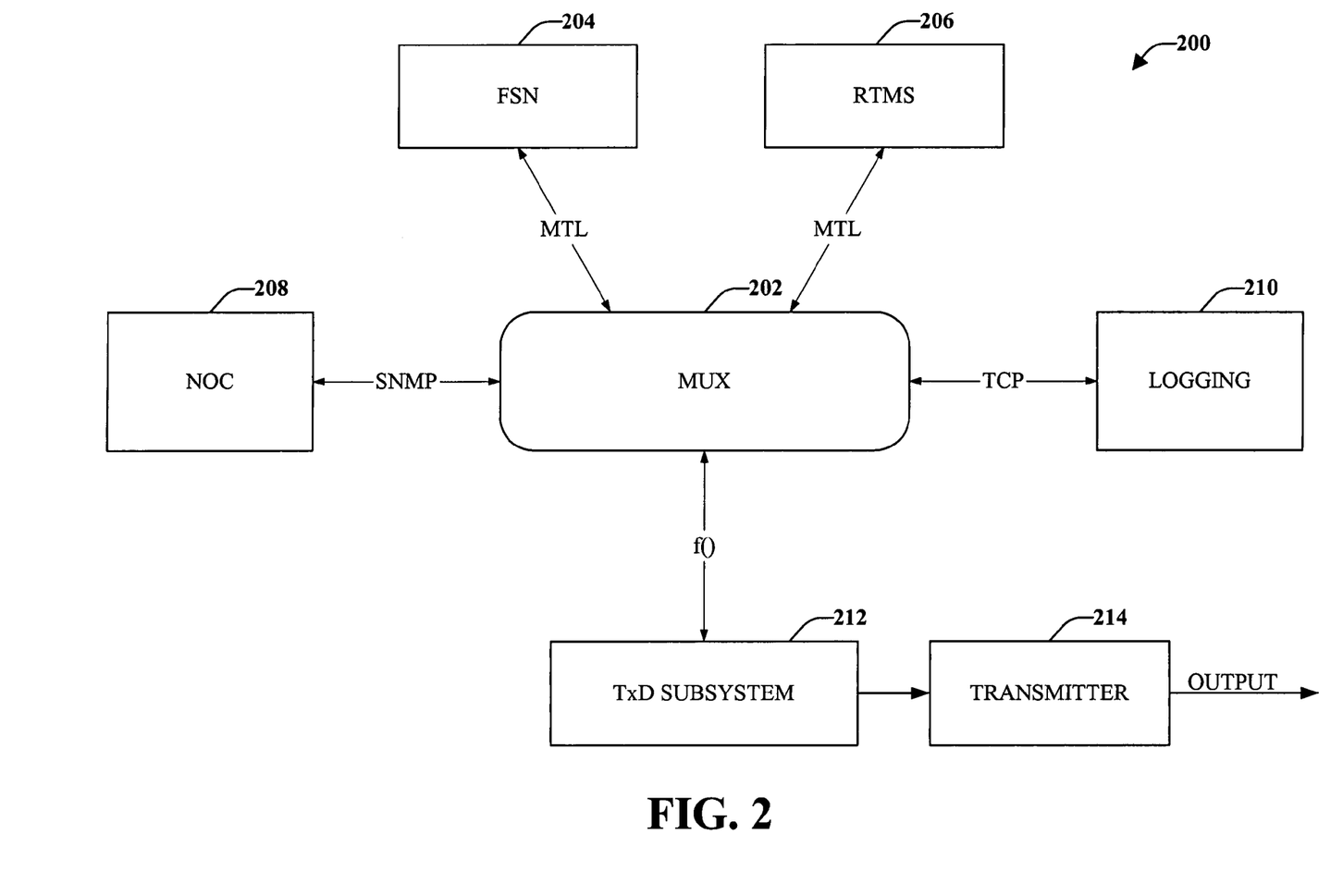
FIG. 2 is a block diagram of a system illustrating multiplex server (MUX) external interfaces that includes a transmit driver subsystem.

For a better understanding of the context of the one or more embodiments disclosed herein, FIG. 2 is a block diagram of a system 200 illustrating multiplex server (MUX) external interfaces that includes a transmit driver subsystem. System 202 can include a MUX 202, a transcoder Serving Node (FSN) 204, a Real Time Media Server (RTMS) 206, a Network Operations Center (NOC) 208, Logging Component 210, and Transmit Driver (TxD) Subsystem 212. TxD Subsystem 212 can include various components to complete its functionality including, a scheduler, a transmit driver, and/or a turbo encoder. Transmit driver subsystem 212 can interface with a transmitter 214 configured to output over the air communication. FSN 204 and RTMS 206 can produce data while TxD subsystem 212 consumes data. NOC 208 and Logging 210 have separate interfaces to MUX 202.

MUX 202 is a component that belongs to a multicast network and can implement an air interface stack for a transmitter subsystem and can interact with other components (e.g., transcoder serving nodes) to obtain data to be transmitted on a per second basis (a "super frame"). Scheduling can be performed by MUX 202 to decide the permissible sizes for individual flows depending on the characteristics of the flows and their momentary bandwidth needs. MUX 202 can then format the data and messages and pass such data and messages to a transmit driver subsystem 212 for further transmission or output over the air (e.g., wireless).

MUX 202 has operational interfaces with FSN subsystem 204 and with TxD subsystem 212. Management interfaces can include an interface with NOC 208 and one interface for logging 210. Each interface can utilize a different mechanism for communication. For example, NOC 208 can use Simple Network Management Protocol (SNMP) to communicate with MUX 202. Logging packets can be sent using the Transmission Control Protocol (TCP). Signaling and bearer data within the RTMS 206 and FSN 204 interface can use Message Transport Layer (MTL) (or Transmission Control Protocol/Internet Protocol (TCP/IP)) messages to communicate. The TxD subsystem 212 interface can consist of function calls. Such function calls can be utilized to request super frames from MUX 202. TxD subsystem 212 may then pass the super frames directly to a turbo encoder or may, for example, format them utilizing a MPEG2 Transport stream format for transmission over ASI.

TxD Subsystem 212 can interface by requesting MUX 202 to deliver a super frame through a function call (SF CMD). MUX 202, in reply, can transfer a super frame through a SF IND message to TxD subsystem 212. MUX 202 can buffer the super frames at substantially the same time as they are processed by TxD subsystem 212 and each time MUX 202 receives a SF CMD, it can release the super frame that was just processed by the TxD subsystem 212.

Figure 3:
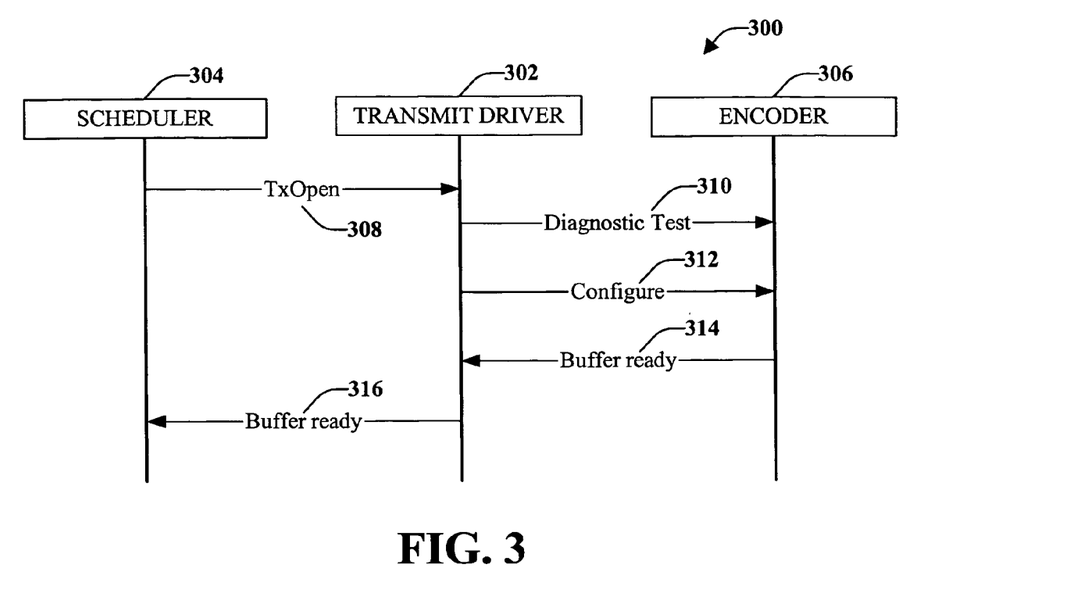
FIG. 3 is a flow diagram representing interactions to open a transmit driver.

FIG. 3 is a flow diagram 300 representing interactions to open a transmit driver. As illustrated, a transmit driver 302 provides an interface between a scheduler 304 and a turbo encoder 306. Scheduler 304 provides LC data streams to transmit driver 302, which accepts the LC data streams and encodes them for over the air (e.g., wireless) transmission.

Client or scheduler 304 allocates or designates transmit driver 302 by invoking a TxOpen function call 308. A callback function pointer can be included as part of (or sent at substantially the same time as) the TxOpen function 308. The callback function pointer can be utilized by transmit driver 302 to notify scheduler 304 when a super frame has been completed, and/or when there are error conditions. Memory allocation failures can be handled by notifying scheduler 504 that an error has occurred.

After or at substantially the same time as receipt of the TxOpen function 308, transmit driver 302 initiates and runs an initial diagnostic test 310 on the turbo encoder 306 to which it interfaces. At substantially the same time as the diagnostic test is being performed, or after completion of the test, transmit driver 302 configures 312 the hardware associated with turbo encoder 306. When the turbo encoder is ready, a notification 314 is sent to transmit driver 302 and transmit driver 302 notifies scheduler 304 that it is ready to receive a super frame 316.

Figure 4:
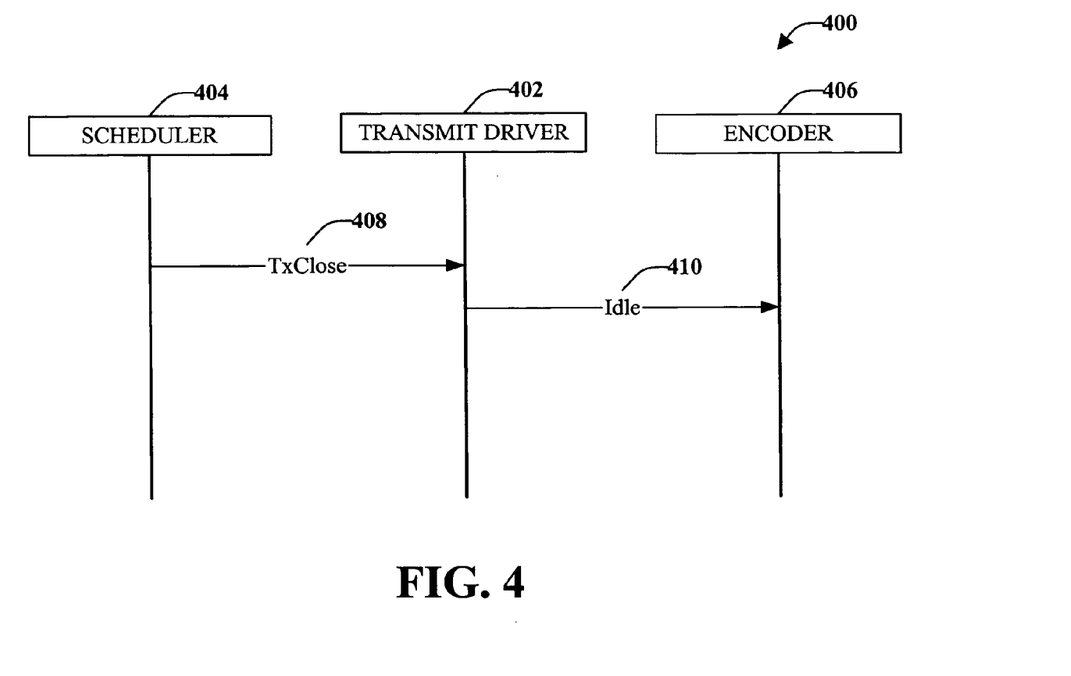
FIG. 4 is a flow diagram representing interactions to close a transmit driver.

FIG. 4 is a flow diagram 400 representing interactions to close a transmit driver. Transmit driver 402 can be deallocated or deselected by scheduler 404, upon receipt of a TxClose function call 408. At substantially the same time as receiving the TxClose function call 408, transmit driver 402 transmits an idle signal 410 to place the hardware or turbo encoder 406 in an idle state and to release internal resources.

Figure 5:
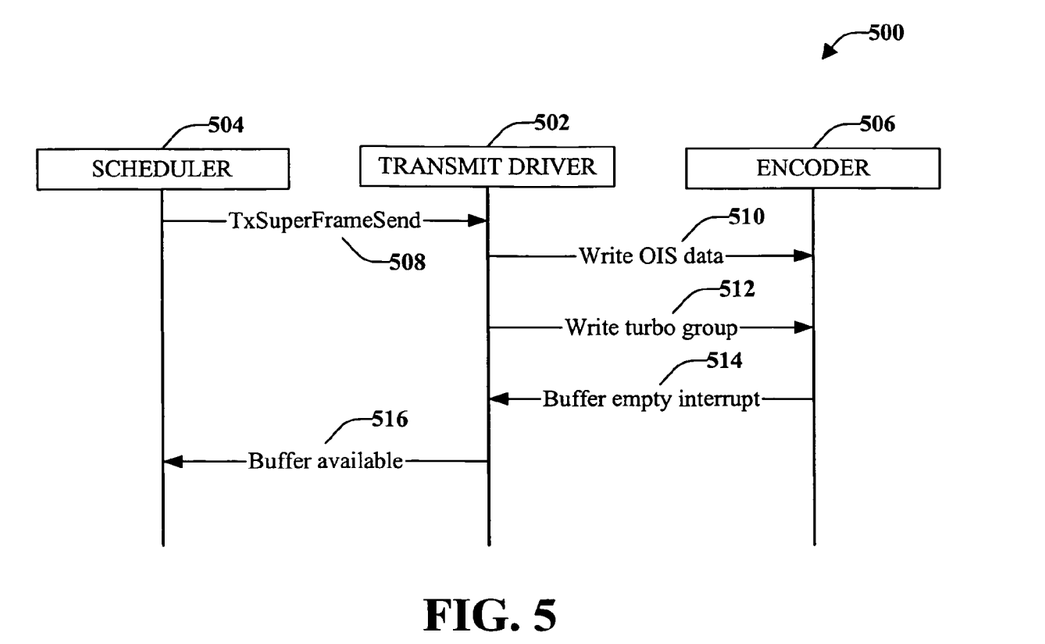
FIG. 5 is a flow diagram representing interactions to send a super frame according to one or more embodiment disclosed herein.

FIG. 5 is a flow diagram 500 representing interactions to send a super frame according to one or more embodiment disclosed herein. Transmit driver 502 provides an interface between a scheduler 504 and a turbo encoder 506. Scheduler 504 invokes a TxSuperFrameSend 508 to send a super frame of data to transmit driver 502. Scheduler 504 can provide the media to transmit driver 502 one super frame at a time by invoking the TxSuperFrameSend function call 508. Scheduler 504 can provide the LOI data, the WOI data, and a list of LCs that will be transmitted during that super frame. Transmit driver 502 writes OIS data 510 to the hardware or turbo encoder 506. Transmit driver 502 also writes one or more turbo groups 512 to turbo encoder 506. For example, transmit driver 502 can write LC 1 frame 1 turbo group 1, at 512. Transmit driver 502 waits to receive a signal from turbo encoder 506 indicating that its buffer is empty 514. Transmit driver 502 can double buffer the super frames and can continue writing turbo groups until the super frame has been consumed or processed. When a super frame has been processed, transmit driver 502 notifies scheduler 504 that it is ready for the next super frame by indicating that the buffer is available 516.

Figure 6:
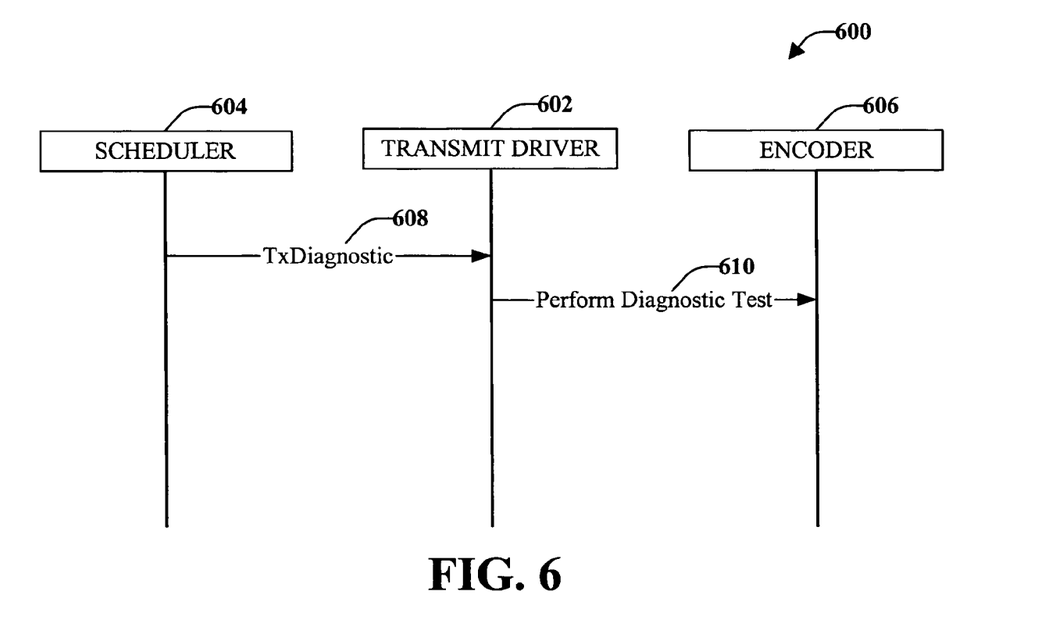
FIG. 6 is a flow diagram representing a diagnostic sequence in accordance with the disclosed embodiments.

FIG. 6 is a flow diagram 600 representing a diagnostic sequence in accordance with the disclosed embodiments. Periodically, automatically, or manually, a diagnostic test can be performed to ensure that system components are operating correctly. To invoke a diagnostic sequence, scheduler 604 sends a TxDiagnostic function call to transmit driver 602 to initiate a diagnostic test. TxDiagnostic function call 608 can include the appropriate diagnostic data. Transmit driver 602 performs the diagnostic test 610 on the hardware or turbo encoder 606.

Figure 7:
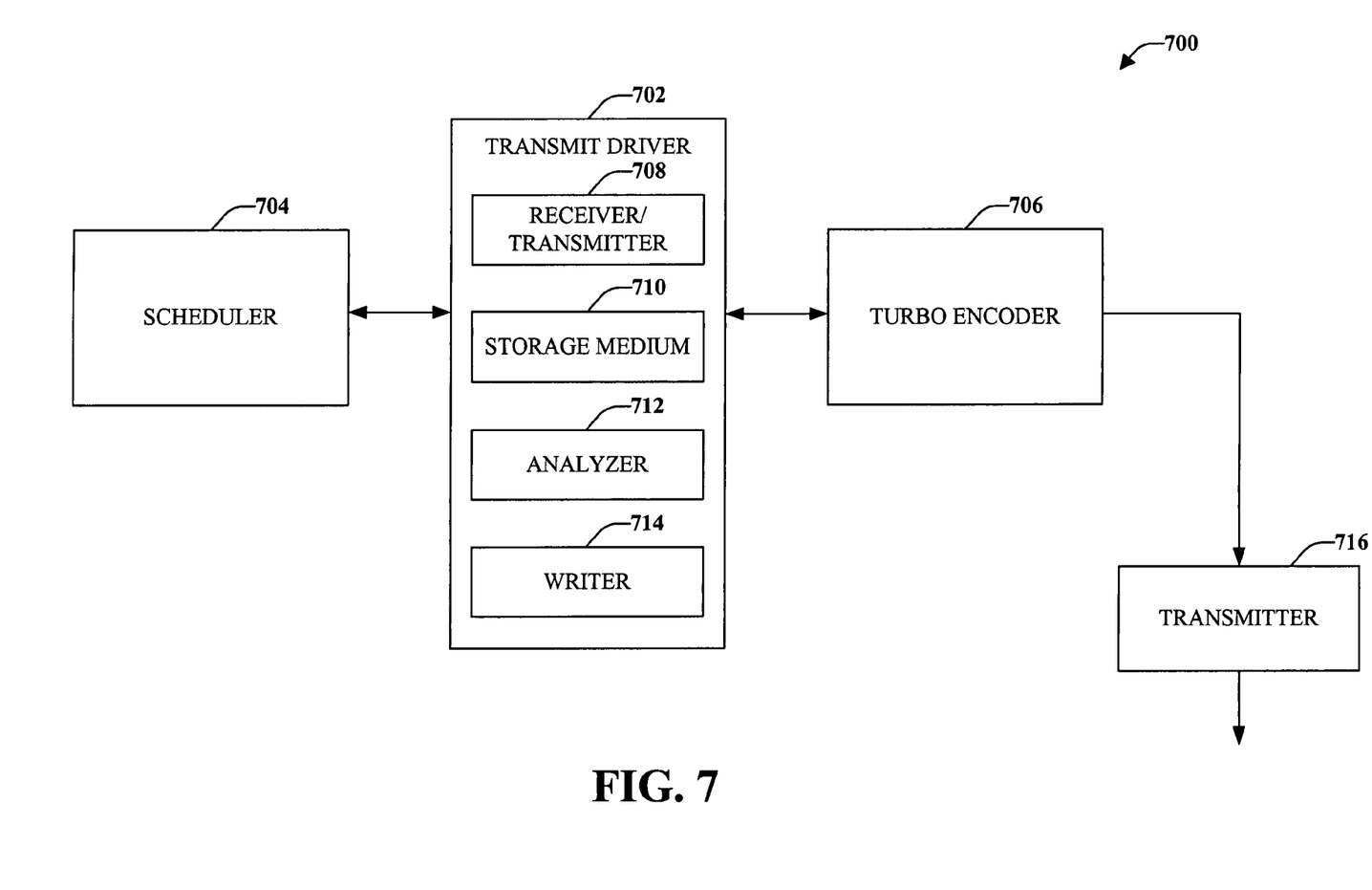
FIG. 7 is a system for data communication that utilizes a transmit driver.

FIG. 7 illustrates a data transmission system 700. System 700 includes a transmit driver 702, a scheduler or transmit client 704, and a turbo encoder 706. Transmit driver 702 can provide an interface between scheduler 704 and turbo encoder 706. The system components 702, 704, and 706 can reside on a computer, for example. To perform its various functionalities, transmit driver 702 can include a receiver/transmitter 708, a storage medium 710, an analyzer 712, and a writer 714.

Receiver/transmitter 708 can be configured to receive a function call from scheduler to initiate an open sequence to allocate transmit driver 702, a close sequence to deallocate transmit driver 702, a call to send a super frame of data, and/or to perform a diagnostic test. Receiver/transmitter 708 can further write data to turbo encoder 706, wherein such data to be written relates to the function call received from scheduler 704. Information from turbo encoder 706 can be sent to a transmitter 716 for subsequent processing and output for over the air (e.g., wireless) transmission. Receiver 708 can further receive a request for a super frame from turbo encoder 706.

Storage medium 710 can be configured to maintain or store a listing of turbo groups and can further sort such turbo groups according to their start symbol as well as other suitable information related to a data transmission system 700. Alternatively, this function can be performed by a processor (not shown) associated with transmit driver 702. Storage medium 710 can be, for example, a memory operatively coupled to transmitter driver 702. It should be appreciated that the data store (e.g., memories, storage medium(s)) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Storage medium 710 of the disclosed embodiments are intended to comprise, without being limited to, these and other suitable types of memory.

When a request from turbo encoder 706 is received by receiver 708 indicating that turbo encoder 706 can accept another super frame, analyzer 712 can analyze or make a determination, by accessing the storage medium 710, for example, whether it has enough data to start another super frame. If the data is available, driver 702, through writer 714, writes the super frame to the appropriate hardware register(s) on turbo encoder 706. Turbo encoder 706 can indicate the availability of ping pong buffers for up to about seven unique LCs. Transmit driver 702 can traverse the sorted list of LCs and write the first turbo group for up to seven LCs found in the list, for example. For each turbo group, the appropriate control information (e.g., start symbol, start slot, height, encoding mode, . . . ) can be written. This process of checking for buffer availability and writing turbo groups can be repeated until the super frame is completed or processed.

According to some embodiments, non-direct memory access (non-DMA) hardware component can be utilized. The hardware can notify transmit driver 702 of buffer availability through an interrupt. Processing of the interrupt can include transferring the next turbo group of LC, if any, for the given frame. If the LC for the given frame has completed, the next LC for the given frame can be selected from the sorted list of LCs that are maintained in storage medium 710. When an entire frame has been processed, the next frame can be started and a similar process is followed to complete the next or subsequent frame(s). When an entire super frame has been processed, the next super frame can be started and a similar process followed.

In some embodiments, hardware supports DMA over a PCI bus. In such embodiments, the hardware can be programmed to read all turbo groups up to around seven LCs for a given frame. The hardware can notify transmit driver 702 through an interrupt when the LC for a given frame has been consumed. The next LC for the given frame can be selected from the sorted list of LCs and the DMA transfer can be initiated. When an entire frame has been processed, the next frame can be started and can follow a similar process. When an entire super frame has been processed, the next super frame can be started and follow a substantially similar process. In some embodiments, transmit driver 702 may copy the turbo groups into a temporary buffer so that all turbo groups in a particular frame that are associated with a given LC are in contiguous memory.

Figure 8:
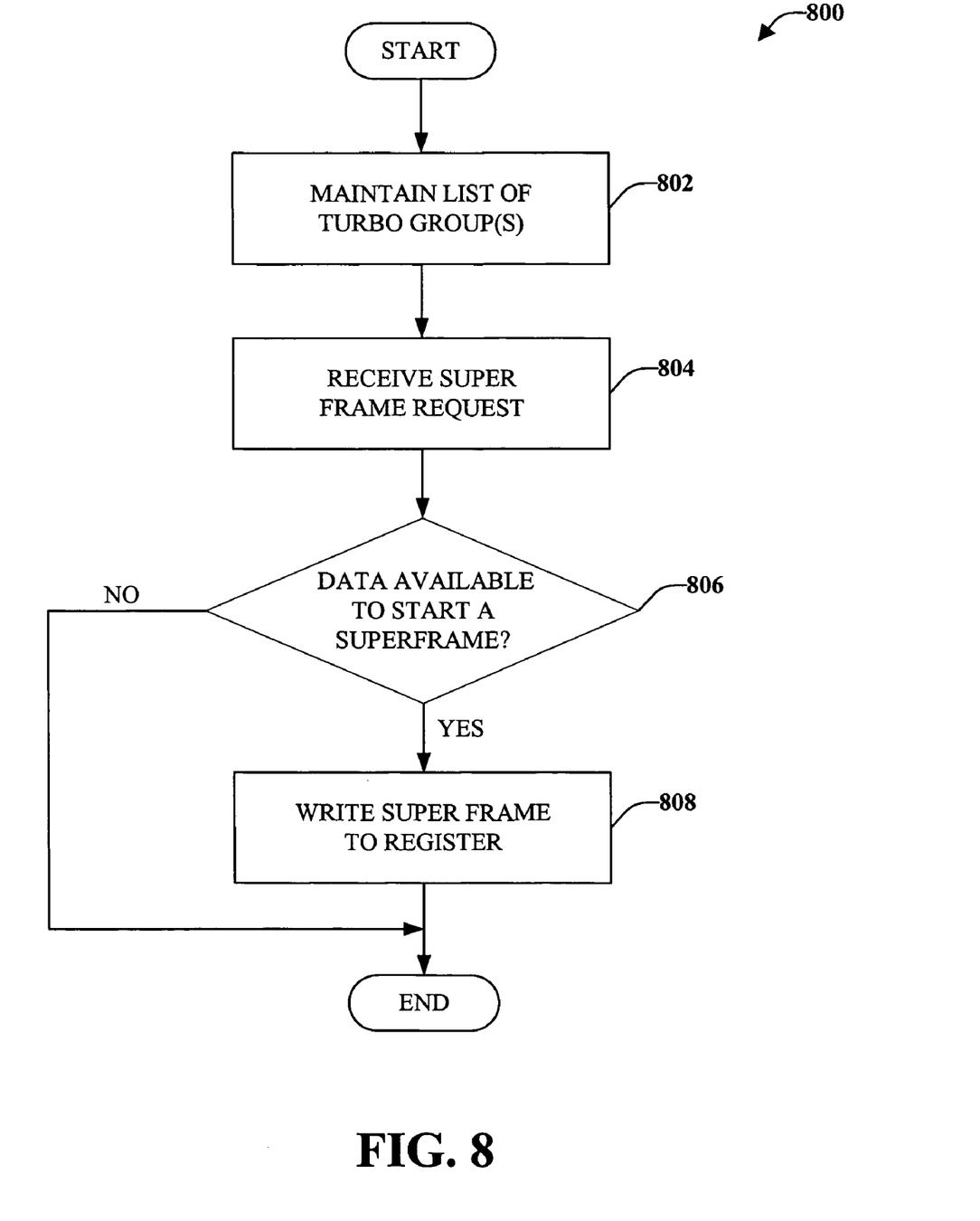
FIG. 8 is a methodology for data communication in accordance with the embodiments disclosed herein.

In view of the exemplary systems shown and described above, methodologies, which may be implemented in accordance with one or more aspects of the various embodiments, will be better appreciated with reference to the diagram of FIG. 8. While, for purposes of simplicity of explanation, the methodology is shown and described as a series of function blocks, it is to be understood and appreciated that the methodology is not limited by the order of blocks, as some blocks may, in accordance with these methodologies, occur in different orders and/or concurrently with other blocks from that shown and described herein. Moreover, not all illustrated blocks may be required to implement a methodology in accordance with one or more aspects of the disclosed embodiments. It is to be appreciated that the various blocks may be implemented by software, hardware, a combination thereof or any other suitable means (e.g. device, system, process, component) for carrying out the functionality associated with the blocks. It is also to be appreciated that the blocks are merely to illustrate certain aspects presented herein in a simplified form and that these aspects may be illustrated by a lesser and/or greater number of blocks. Moreover, not all illustrated blocks may be required to implement the following methodologies. Those skilled in the art will understand and appreciate that a methodology could alternatively be represented as a series of interrelated states or events, such as in a state diagram.

FIG. 8 is a methodology 800 for data communication in accordance with the embodiments disclosed herein. Method begins at 802, where a list of turbo group(s) are maintained. These turbo groups can be maintained or stored in a memory or other storage medium and should be retrievable upon demand. The turbo group can include four turbo packets and a logical channel (LC) that includes sixteen turbo packets divided into groups of four turbo packets. At 804, a super frame request is received. This request can be received from, for example, a turbo encoder for subsequent processing and over the air (e.g., wireless) transmission.

A determination is made, at 806, whether there is data available to start a super frame in response to the request received, at 804. Such a determination can be made based on information stored in a storage medium associated with transmit driver. If there is not enough information available ("NO"), the method 800 ends. If the determination is that there is enough information available ("YES"), the super frame is written to an appropriate hardware register(s), at 808. It should be understood that a subsequent frame can be processed utilizing a similar methodology 800.

Non-DMA hardware can request a super frame by notifying the driver of buffer availability through an interrupt. Processing of the interrupt can include transferring the next turbo group of an LC (if any) for the given frame. For hardware supporting DMA, to request a super frame, the hardware can notify the driver through an interrupt when an LC for a given frame has been consumed. From the sorted list of LCs, the next turbo group of LC for the frame is selected. Thus, the interrupt can be selectively processing depending on whether the hardware component is a direct memory access hardware component or a non-direct memory access hardware component.

Figure 9:
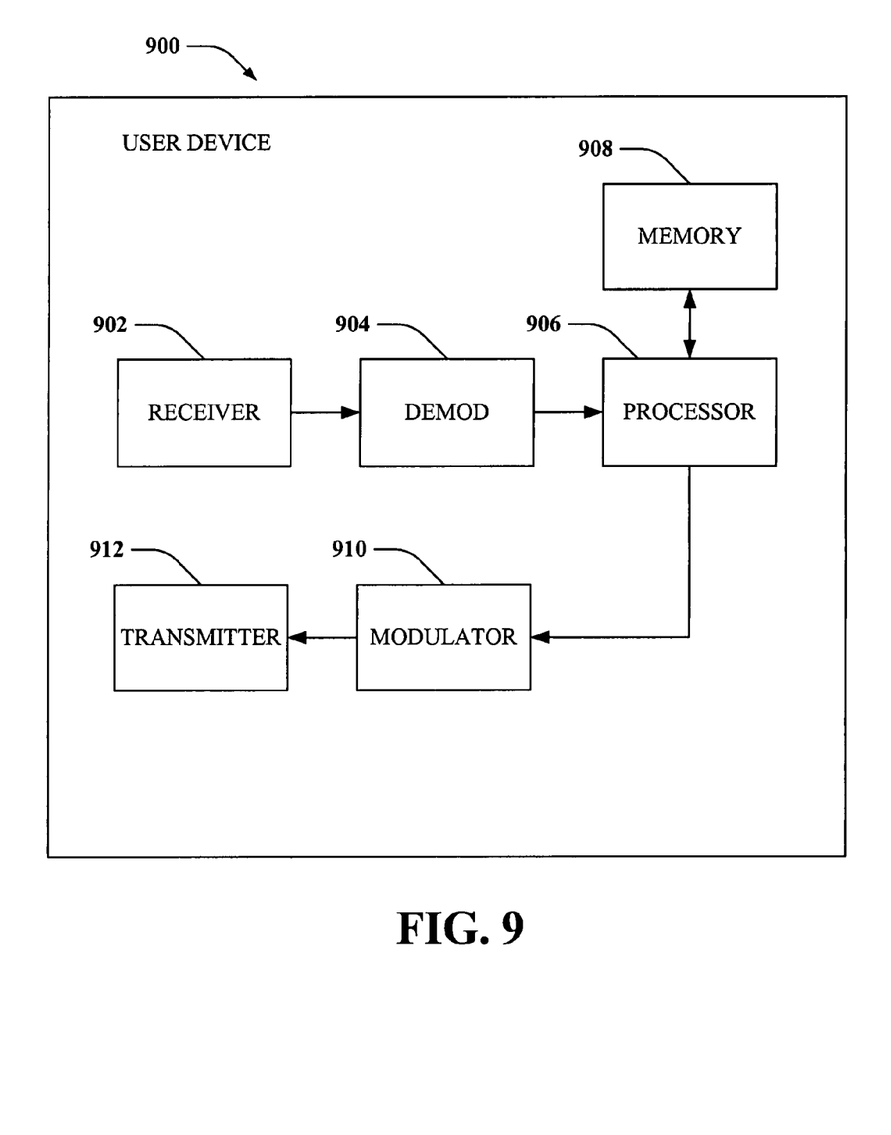
FIG. 9 illustrates a system that facilitates data communication between a transmit driver and a user device in a wireless communication environment in accordance with one or more of the disclosed embodiments.

With reference now to FIG. 9, illustrated is a system 900 that facilitates data communication between a transmit driver and a user device in a wireless communication environment in accordance with one or more of the disclosed embodiments. System 900 can reside in an access point and/or in a user device. System 900 comprises a receiver 902 that can receive a signal from, for example, a receiver antenna. The receiver 902 can perform typical actions thereon, such as filtering, amplifying, downconverting, etc. the received signal. The receiver 902 can also digitizes the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 916. Processor 906 control one or more components of user device 900, and/or processor 906 that analyzes information received by receiver 902, generates information for transmission by transmitter 916 and controls one or more components of user device 900. Processor 906 may include a controller component capable of coordinating communications with additional user devices.

User device 900 can additionally comprise memory 908 that is operatively coupled to processor 906 and that stores information related to coordinating communications and any other suitable information. Memory 908 can additionally store protocols associated with coordinating communication. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 still further comprises a symbol modulator 910 and a transmitter 912 that transmits the modulated signal.

Figure 10:
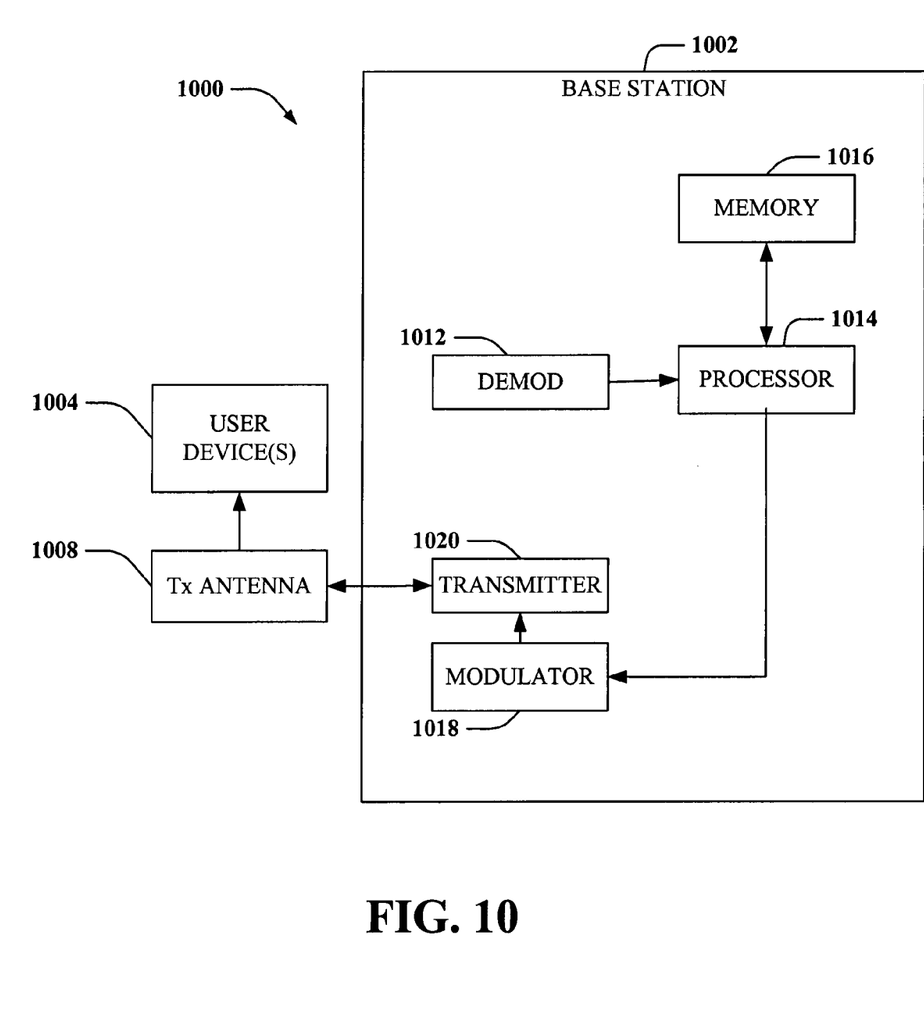
FIG. 10 illustrates a system that coordinates communication in a wireless communication environment in accordance with various aspects.

FIG. 10 is an illustration of a system 1000 that facilitates coordination of communication protocols in accordance with various aspects. System 1000 comprises a base station or access point 1002. As illustrated, base station transmits to the one or more user devices 1004 through a transmit antenna 1008.

Base station 1002 comprises a demodulator 1012 that demodulates received information. Demodulated symbols are analyzed by a processor 1014 that is coupled to a memory 1016 that stores information related to code clusters, user device assignments, lookup tables related thereto, unique scrambling sequences, and the like. A modulator 1018 can multiplex the signal for transmission by a transmitter 1020 through transmit antenna 1008 to user devices 1004.

Figure 11:
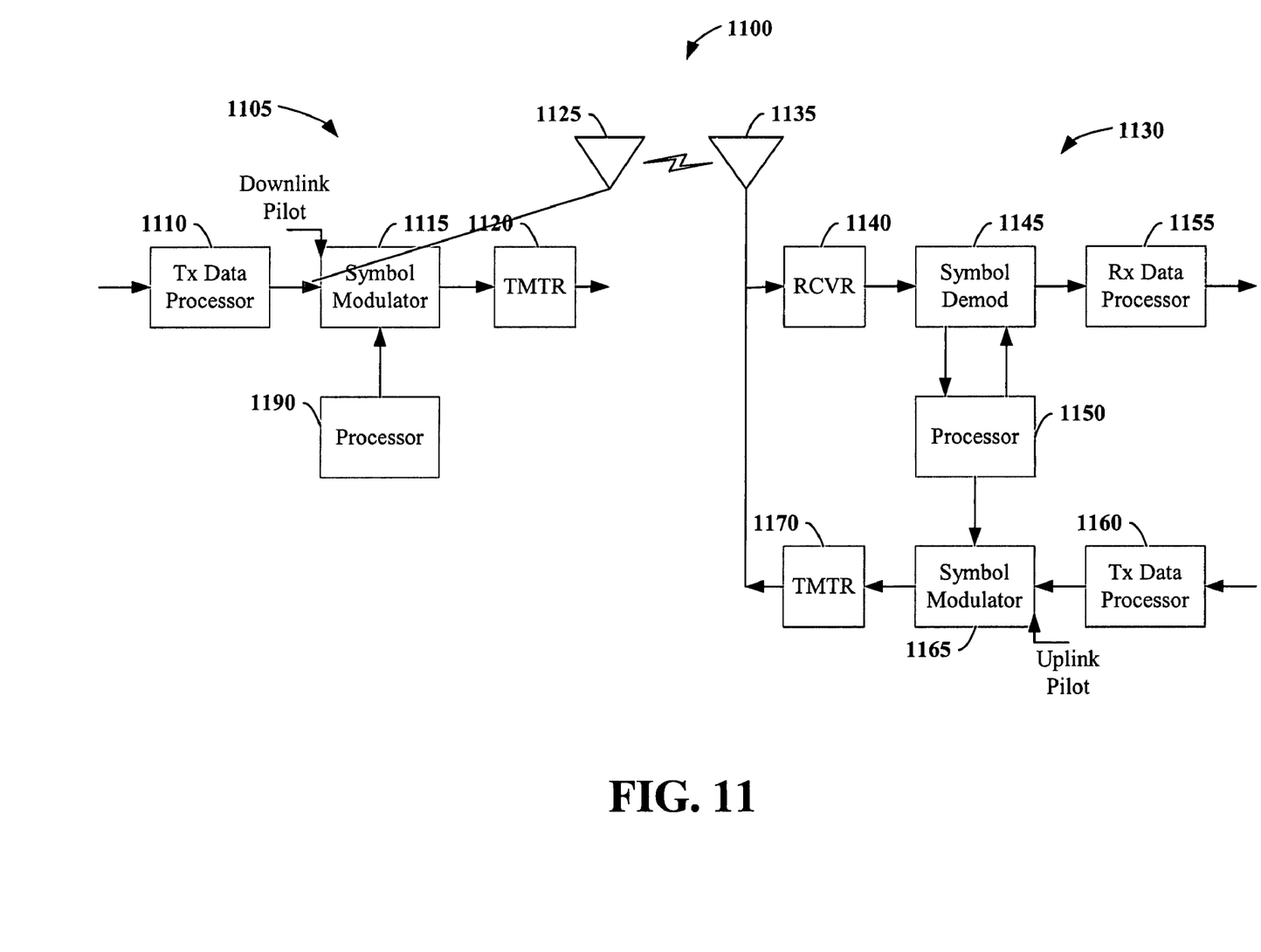
FIG. 11 illustrates a wireless communication environment that can be employed in conjunction with the various systems and methods described herein.

FIG. 11 illustrates an exemplary wireless communication system 1100. Wireless communication system 1100 depicts one base station and one terminal for sake of brevity. However, it is to be appreciated that system 1100 can include more than one base station or access point and/or more than one terminal or user device, wherein additional base stations and/or terminals can be substantially similar or different for the exemplary base station and terminal described below. In addition, it is to be appreciated that the base station and/or the terminal can employ the systems and/or methods described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 obtains N received symbols and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for downlink.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

Figure 12:
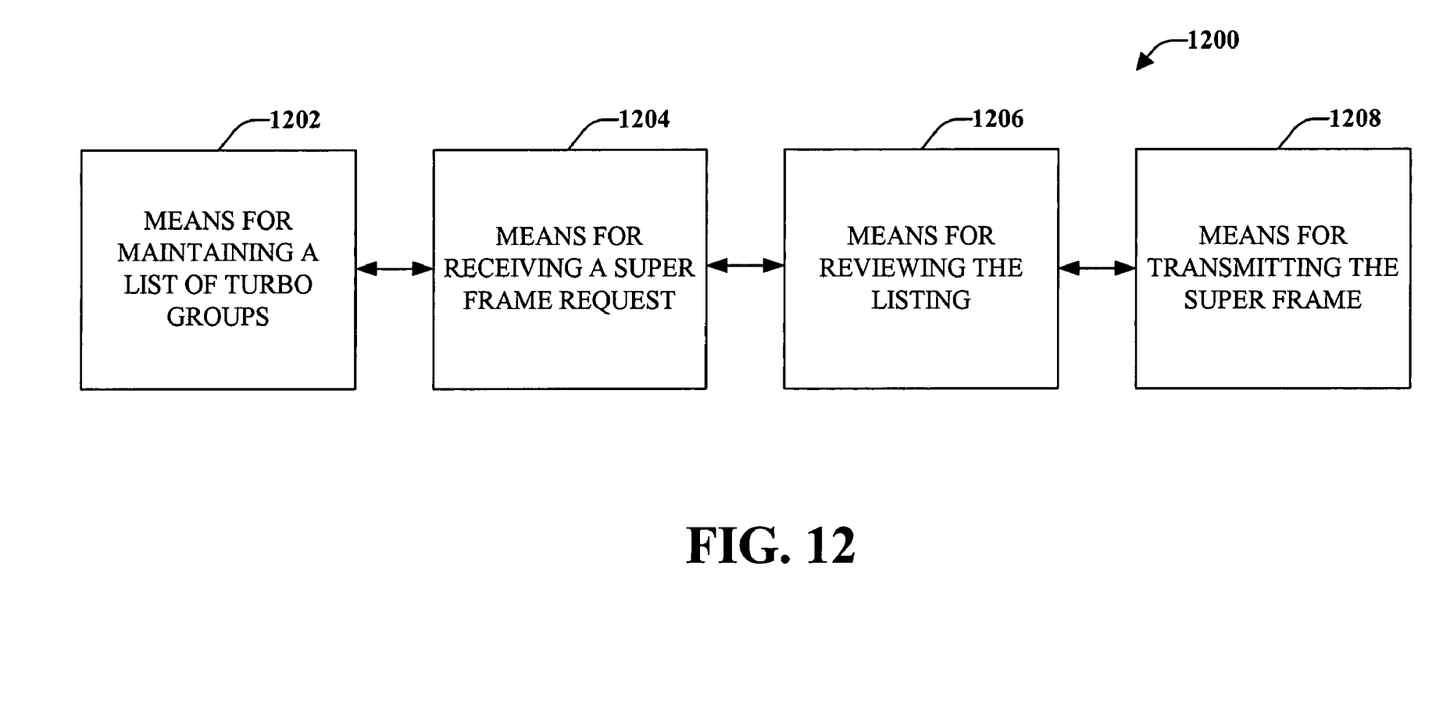
FIG. 12 illustrates a data communication system in accordance with the various embodiments.

With reference now to FIG. 12, illustrated is a data communication system 1200. System includes a means for maintaining a list of turbo groups 1202, wherein a turbo group comprises four turbo packets and a logical channel (LC) that includes at least four groups of four turbo packets. The means for maintaining a list of turbo groups 1202 interfaces with a means for receiving a super frame request 1204. The super frame request can be received from a direct memory access hardware component or a non-direct memory access hardware component. Upon receipt of the request, a means for reviewing the maintained list 1206 access the maintained list and makes a determination whether there is data is available to complete the request. If there is enough data available, a means for transmitting the super frame 1208 communicates or transmits the super frame to a register(s) associated with the hardware component that sent the request.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for data transmission, the method comprising:
maintaining a sorted list of turbo groups, wherein a turbo group includes four turbo packets, and a logical channel that includes at least sixteen turbo packets divided into four turbo groups;
receiving, at a transmit driver, a request from an encoder for a super frame to be encoded for over the air transmission by a transmitter that is coupled to the encoder;
ascertaining if enough data to process the super frame is available by analyzing the sorted list of turbo groups; and
in response to receiving the request for the super frame to be encoded for over the air transmission and in response to ascertaining that there is enough data available to process the super frame, sending the super frame to the encoder, wherein the super frame is encoded by the encoder prior to transmission.

2. The method of claim 1, wherein an encoded super frame output of the encoder is transmitted over the air by the transmitter.

3. The method of claim 1, further comprising:
receiving an interrupt from a non-direct memory access hardware component if a buffer is available;
selecting a next turbo group of the logical channel from the sorted list of turbo groups; and
transferring the next turbo group for a frame.

4. The method of claim 1, further comprising:
receiving an interrupt from a direct memory access hardware component, the interrupt indicating that the logical channel has been consumed;
selecting a next turbo group of the logical channel from the sorted list of turbo groups; and
initiating a direct memory access transfer.

5. The method of claim 4, further comprising copying the turbo groups in a temporary buffer.

6. An apparatus, for data transmission, the apparatus comprising:
a receiver that receives a request for a super frame to be encoded for over the air transmission;
a storage medium that maintains a list of turbo groups;
an analyzer that analyzes the list of turbo groups to determine if data to begin the super frame is available based on the received request; and
a writer that writes the super frame to a hardware register if the data to begin the super frame is available to be encoded and transmitted over the air by a transmitter.

7. The apparatus of claim 6, further comprising:
the receiver receives a function call from a scheduler; and
a written super frame is output by a turbo encoder for over the air transmission, and wherein the hardware register that receives the super frame from the writer is within the turbo encoder.

8. The apparatus of claim 7, the function call is one of an open sequence, a close sequence, a super frame send, and a diagnostic sequence.

9. The apparatus of claim 6, wherein the receiver further receives from a direct memory access hardware component an interrupt indicating that the logical channel has been processed.

10. The apparatus of claim 9, further comprising:
the analyzer selects a next logical channel from the list of turbo groups; and
the writer processes a direct memory access transfer to the direct memory access hardware component.

11. The apparatus of claim 6, wherein the receiver further receives from a non-direct memory access hardware component an interrupt if a buffer is available.

12. The apparatus of claim 11, wherein the analyzer selects a next logical channel from the list of turbo groups and the writer sends a next turbo group for a frame to the non-direct memory access hardware component.

13. A computer readable storage medium containing executable instructions, which, when executed by a processor, cause the processor to:
receive a request for a super frame to be encoded for over the air transmission;
maintain a list of turbo groups;
analyze the list of turbo groups to determine if data is available to begin the super frame based on the received request; and
write the super frame to a hardware register if the data to begin the super frame is available to be encoded and transmitted over the air by a transmitter.

14. The computer readable storage medium of claim 13, further containing executable instructions to:
receive a function call to perform one of an open sequence, a diagnostic sequence, a super frame send sequence, and a close sequence; and
process the function call to control a hardware component.

15. The computer readable storage medium of claim 14, further containing executable instructions to:
receive an interrupt; and
selectively process the interrupt whether the hardware component is a direct memory access hardware component or a non-direct memory access hardware component.

16. The computer readable storage medium of claim 15, further containing executable instructions to:
selectively process the interrupt if the hardware component is a direct memory access hardware component;
select a next logical channel from the list of turbo groups; and
transmitting a direct memory access transfer to the direct memory access hardware component.

17. The computer readable storage medium of claim 15, further containing executable instructions to:

selectively process the interrupt if the hardware component is a non-direct memory access hardware component;

select a next logical channel from the list of turbo groups; and transmit the next logical channel.

18. An apparatus for communicating data, the apparatus comprising:

means for maintaining a list of turbo groups;

means for receiving a request to transmit a super frame;

means for reviewing the list of turbo groups to determine if data to transmit the super frame is available to complete the request; and means for providing the super frame to at least one register if the data is available to complete the request, wherein the super frame is provided to the at least one register to be encoded and transmitted over the air by a transmitter.

19. The apparatus of claim 18, further comprising:

means for analyzing the list of turbo groups for a plurality of logical channels; and means for writing the plurality of logical channels and associated control information to a hardware component.

20. A processor readable medium containing processor executable instructions that are operative to cause a processor to:

sort a listing of turbo groups, wherein a turbo group includes four turbo packets and a logical channel that includes at least four turbo groups;

store the sorted list of turbo groups;

receive a request to output a super frame to be encoded for over the air transmission;

determine if enough data to process the super frame is available by analyzing data of the sorted list of turbo groups; and output the super frame to be encoded and transmitted over the air by a transmitter if enough data to process the super frame is available.

* * * * *